United States Patent [19]

Carroll et al.

[11] 4,277,385
[45] Jul. 7, 1981

[54] HIGH PVC LATEX PAINT

[75] Inventors: Howard E. Carroll, Grafton; Gerald M. Sweitzer, North Ridgeville, both of Ohio

[73] Assignee: SCM Corporation, New York, N.Y.

[21] Appl. No.: 145,612

[22] Filed: May 1, 1980

Related U.S. Application Data

[63] Continuation-in-part of Ser. No. 10,631, Feb. 9, 1979, abandoned.

[51] Int. Cl.³ .............................................. C08L 33/02
[52] U.S. Cl. .................. 260/29.6 RW; 260/29.6 WB; 260/29.7 W
[58] Field of Search ............. 260/29.6 RW, 29.6 WB, 260/29.7 W

[56] References Cited

U.S. PATENT DOCUMENTS 3,423,351  1/1969  Pierce .................................. 260/29.6
4,069,186  1/1978  Ramig ......................... 260/29.6 RB Primary Examiner—Paul R. Michl
Attorney, Agent, or Firm—Thomas M. Schmitz

[57] ABSTRACT

An opacified latex paint comprising acrylic film-forming latex binders in combination with minor amounts of opacifying pigment and substantial amounts of non-film-forming polymeric particles (plastic pigment) provides a latex paint composition having desirable film integrity properties. The plastic pigment latex paint is compounded at a substantially high pigment-volume-content (PVC) greater than 75% PVC and yet produces a continuous crack-free paint film even though the dried paint film is highly loaded with non-film-forming components. The opacified paint films maintain excellent physical properties such as scrub resistance, burnish resistance, mar resistance, stain resistance, and other desirable paint film integrity properties.

4 Claims, No Drawings

HIGH PVC LATEX PAINT

This is a continuation-in-part of Ser. No. 010,631 filed Feb. 9, 1979, now abandoned, and the same is incorporated herein by reference.

BACKGROUND OF THE INVENTION

This application relates to the commonly assigned U.S. Pat. No. 4,069,186 pertaining to latex paint containing solid plastic pigment particles, and the disclosure thereof is incorporated herein by reference.

Prior to plastic pigment latex paints as disclosed in U.S. Pat. No. 4,069,186, conventional high quality latex paint compositions contained opacifying pigments such as $TiO_2$ and non-opacifying pigments such as inerts or extenders to produce high quality paint films which can be easily washed or scrubbed without ruining the paint film surface. The quality of prior art paint films ordinarily is inversely related to the surface porosity of the dried or cured paint film wherein non-porous film surfaces are desirable and porous film surfaces are avoided so as to maintain a continuous integral paint film surface substantially free of surface porosity and quite resistant to permanent surface deterioration. A standard parameter for identifying and formulating conventional latex paints is the pigment-volume-content (PVC) of the paint wherein PVC indicates the percent by volume of dry pigment non-film-forming solids present in the dried paint film. High quality prior art paints are compounded below critical PVC which is a maximum PVC before paint film integrity properties quickly diminish.

Commonly assigned U.S. Pat. No. 4,069,186 discloses an improved latex paint composition utilizing solid non-film-forming plastic particles in combination with opacifying pigments to provide a latex paint composition having a pigment-volume-content (PVC) greater than the critical-PVC to provide substantially improved opacified paint films at a wide range of PVC levels above the critical-PVC. The dried paint films have excellent high opacity coincident with high enamel holdout and low surface porosity to produce paint films that maintain excellent film integrity and remain resistant to surface deterioration as well as being easy to scrub.

It now has been found that very desirable paint films can be obtained from plastic pigment latex paint compositions having substantially high PVC's beyond 75% PVC and broadly between 75% and 85% PVC. The dried paint films are continuous non-cracking film which surprisingly maintain substantial film integrity properties such as dirt resistance, grime resistance, mar resistance, stain resistance, abrasion resistance, scrub resistance, and like film integrity properties. The high PVC plastic pigment paints are highly loaded with non-film-forming polymeric particles (plastic pigment) but do not contain non-opacifying extender or filler pigments whereby cracking and non-continuous film formation are avoided. Small particle acrylic binders appear to properly coalesce at a rate sufficiently slow as to avoid internal stresses and resulting cracking in the film. The particular coalescent and higher boiling point glycols control the binder coalescence and is speculated to sinter or otherwise promote a surface effect with plastic pigment to obtain continuous films at extraordinary high PVC's above 75% PVC. Accordingly, it has been found that a good quality plastic pigment latex paint can be compounded containing substantial levels of non-film-forming polymeric particles in combination with opacifying pigments and acrylic binders. The resulting dried paint film produces resilient continuous and crack-free paint film surfaces which surprisingly resist film surface deterioration in a manner comparable to conventional high quality latex paint films.

These and other advantages of this invention will become more apparent by referring to the Detailed Description of the Invention.

SUMMARY OF THE INVENTION

Briefly, the invention pertains to a latex paint composition compounded at a high pigment-volume-content (PVC) at a PVC between 75% and 85%. The latex paint comprises small particle acrylic film-forming latex binders having an average particle size less than about 0.5 microns in combination with extraordinary high levels of non-film-forming polymeric particles containing 0.2% to 2% copolymerized carboxylic monomers, and minor amounts of opacifying pigments. The latex paint is substantially free of non-opacifying filler or extender pigment.

DETAILED DESCRIPTION OF THE INVENTION

The latex paint of this invention is an extraordinarily high PVC paint having a pigment-volume-content (PVC) greater than 75% and up to 85% PVC and containing binder, opacifying pigment, and substantially high levels of plastic pigment.

The plastic pigment latex paint contains an acrylic film-forming binder having an average particle size less than about 0.5 microns and preferably rather uniform particles having an average size of about 0.1 to 0.3 microns. The acrylic binder contains by weight at least about 90% copolymerized acrylic unsaturated monomers and preferably 100% copolymerized acrylic monomers. All acrylic binders having a uniform average particle size less than about 0.5 microns are particularly suitable for wet adhesion to the substrate as well as providing excellent binding to the diverse non-film-forming components. Acrylic unsaturated monomers include lower alkyl esters of acrylic or methacrylic acid having an alkyl ester portion contaning between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxy alkyl acrylates and methacrylates such as hydroxyethyl and hydroxypropyl acrylates and methacrylates, as well as amino acrylates and methacrylates. The acrylic monomers can be copolymerized with minor amounts of ethylenically unsaturated monomers other than acrylic monomers. Ethylenically unsaturated monomers other than said acrylic unsaturated monomers can include, for example, those monomeric materials exhibiting ethylenic double bond unsaturation such as polymerizable vinyl, allylic, fumaric, maleic, or like ethylenically unsaturated double bond functionality (carbon-to-carbon unsaturation) which can be copolymerized with the acrylic double bond unsaturation in said acrylic unsaturated monomers. Ethylenically unsaturated monomers can include, for example, styrene, alpha-methyl styrene and substituted alkyl styrenes, chlorostyrene, vinyl toluene, vinyl naphthalene, dibutyl maleate, butadiene, vinyl chloride, vinylidene chloride, acrylamide and acrylonitrile and similar ethylenically unsaturated monomers. The ethylenically unsaturated monomers can be copolymerized with said monomers containing acrylic unsaturation by free radical induced addition polymerization using peroxy or azo catalysts, common redox catalysts, ultraviolet radiation, or the like. The particle size of the film-forming acrylic binder can be between 500 Å and 5,000 Å and preferably between about 1,000 to 3,000 Å to provide desirable flow-out, leveling, and wet hiding properties to the wet paint film. The film-forming binder should constitute between 15% to 25% based on the dry solids volume of the film.

The preferred acrylic binders have a glass transition temperature suitable for fusing and coalescing in a film under application or ambient temperature. Air drying paints at ordinary room temperature (25° C.) requires a film-forming binder with polymer particles having a glass transition temperature (Tg) of at least 5° C. and preferably at least 15° C. below the coalescing temperature to form a film or binding matrix at the ambient temperature. The glass transition temperatures of the film-forming binder of this invention is at least about 10° C. lower than the Tg of the non-film-forming polymeric particles. Preferably the differential between the film-forming polymer particles is about 30° C. The term "glass transition temperature" is a term well-known in the art and generally defines a minimum softening temperature descriptive of long range translational motion of polymer molecules which results in plastic deformation or flow. A polymer particle having a glass transition temperature greater than room temperature will be a non-film-former at room temperature. The glass transition temperature can be measured in accordance with *Journal of Paint Technology*, 41 (530), pages 167–178 (1969). The glass transition temperature (Tg) for a film-forming polymer particle herein is measured when such polymer particle is in the aqueous latex emulsion paint mixture whereby the interacting effects of the various paint ingredients particularly coalescing solvents are taken into account. Alternatively, the Tg of the film-forming particles can be estimated by Vicat softening point as determined by ASTM Test D-1525.

The paint composition of this invention further includes non-film-forming polymer particles containing 0.2 to 2% copolymerized acrylic or methacrylic acid which has been found to impart good wet adhesion of the film to the substrate. Wet adhesion is important in enamel or hard surface paints since such paints are often used in high moisture areas such as bathrooms and kitchens. Wet adhesion is the ability to adhere to a previously painted surface in high moisture environments. The non-film-forming polymeric particles are solid and non-cellular as well as being non-film-forming under conditions of application whereby the particles remain as discrete particles in the paint film. The non-film-forming polymer particles have a glass transition temperature of at least about 5° C. and preferably about 25° C. higher than the ambient temperature that the paint film coalesces into a hardened dry paint film. Paint films are formed by coalescence of the film-forming binder into a binding matrix at the application temperature to generate a hard, tack-free paint film. Thus, paint films of this invention applied and formed at room temperature of about 25° C. will contain non-film-forming polymer particles having a glass transition temperature (Tg) of at least about 30° C. and preferably at least about 50° C. The glass transition temperature (Tg) for the solid non-film-forming polymer particles herein is measured when such polymer particles are in the aqueous latex emulsion paint mixture whereby the interacting effects of the various paint ingredients particularly coalescing solvents are taken into account. The Tg of non-film-forming polymer particles can be estimated by Vicat softening point as determined by ASTM Test D-1525.

The non-film-forming polymer particles have a weighted average particle diameter between about 2,000 Å and 8,000 Å (0.2 to 0.8 microns) in accordance with this invention so as to obtain increased film integrity properties and particularly to obtain continuous paint films substantially free of cracking. Small particles tend to cause mud-cracking in paint films. Average particle diameters can be measured in accordance with centrifugal separation by a disc centrifuge, *Polymer Engineering and Science*, 14 (5), May 1974, pp. 332–337. The non-film-forming polymer particles are solid, non-cellular polymer particles and preferably are substantially spherical in geometric shape. The polymer particles have integral continuous surfaces substantially free of vesiculated or porous cellular surfaces. The non-film-forming polymer particles can be copolymerized ethylenically unsaturated monomers having a carbon-to-carbon ethylenic double bond unsaturation capable of addition polymerization through the ethylenic double bond and include, for example, styrene and substituted styrenes, vinyl chloride, vinylidene chloride, acrylonitrile, methacrylonitrile, esters of methacrylic acid and tertiary butyl acrylate, or copolymers thereof or with other monomers such that the aforementioned Tg requirements are met. The non-film-forming plastic pigment particles contain between about 0.2% to 2% copolymerized carboxylic monomer selected from acrylic acid and methacrylic acid. The minor amount copolymerized acrylic or methacrylic acid has been found necessary to obtain wet adhesion of the cured paint film at the very high PVC's in accordance with this invention. Adhesion is maintained along with resiliency and non-cracking even though they film up highly loaded with non-film forming components. Preferred particles are polymers of styrene copolymerized with minor amounts of acrylic or methacrylic acid. Non-film-forming polymer particles are utilized at extraordinary high levels of at least about 72% and preferably between about 72% and 77% on the dry solids volume basis.

A particularly surprising aspect of this invention is the ability of the latex paint compositions compounded at very high PVC's of around 80% PVC to form a continuous crack-free paint film even though the paint film is highly loaded with non-film-forming components. A further contributing factor to the crack-free film formation is the advantageous use of higher boiling point glycols such as diethylene glycol rather than conventional lower boiling point glycols such as ethylene glycol. Other suitable glycols include 1,3 butylene glycol and 1,4 butylene glycol, and dipropylene glycol. Accordingly, the preferred glycol should have a boiling point of at least about 230° C. and should be utilized at the level of about 40 pounds of glycol per 100 gallons of latex paint to achieve good crack-free paint films. Although not intended to be bounded by theory, it is theorized that the higher boiling glycol additives effectively delay irreversible film formation of the film forming binder thereby permitting a surface affect or interaction with the non-film-forming plastic pigment wherein the surface of plastic pigment particles tends to sinter and/or swell and possibly provides some flexibility to the coalesced paint film and thus imparts continuity and non-cracking properties to the dried paint film. The absence of non-opacifying extender pigment further appears to contribute to continuous and crack-free films.

The latex paint of this invention further contains a minor amount of opacifying pigments which generally have a refractive index of at least about 1.8. Typical white opacifying pigments include rutile and anatase titanium dioxides, lithopone, zinc sulfide, lead titanate, antimony oxide, zirconium oxide, titanium calcium, white lead, titanium barium, zinc oxide, leaded zinc oxide, mixture of the same, and like pigments. The preferred white inorganic opacifying pigment is rutile titanium dioxide having a weight average particle size between about 0.2 to 0.4 microns. Titanium yellow and like pigments having a high refractive index can be utilized as opacifying pigments as well as imparting tints to the paint. Opacifying pigments comprise at least about 3% and preferably between 3% and 8% on a dry volume solids basis of the latex paint. Between 0% and 5% of non-opacifying tinctorial pigments can be added such as ferrite yellow oxide, ferric oxide, brown or tan oxide of iron, raw sienna, raw and burnt umber, chromium oxide green, ultramarine blue, carbon black, lampblack, toluidine red, cadmium reds and yellows, duratone red, chrome yellow and similar tinctorial pigments. The non-film-forming polymer particles appear to function as a binder extender at very high PVC's. Ordinary paint films are usually about 1 to 3 mils thick when applied by brush or roller, or higher for heavy build films.

The latex paints of this invention are substantially free of non-opacifying inorganic pigments commonly referred to as inerts or extender pigments which appear to cause excessive cracking and discontinuities in the dried paint film. On a dry volume solid basis, the latex paint contains 15% to 25% acrylic film-forming binder, 72% to 77% of non-film-forming plastic pigment, and 3% to 8% opacifying pigment.

The latex paint of this invention further contains coalescent materials for coalescing the wet paint film and forming a binding film matrix during the drying process. Coalescing solvents include for example phenyl ether of diethylene glycol, diethylene glycol butyl ether and dibutyl phthalate, diethylene glycol monobutyl ether acetate or monoethyl ether acetate. Particularly desirable coalescent solvents include diethylene glycol monobutyl ether acetate, 2, 2, 4-trimethyl pentanediol-1,3-monisobutyrate, diethylene glycol mono-N-hexyl ether dibutyl phthalate, glycol bases containing ether linkages, and n-propoxy propanol.

The inventive latex emulsion paint can be made in a disperser mill such as a Cowles disperser. All the conventional pigment dispersion ingredients except the non-film-forming polymer particles and film-forming binder are first mixed together in the disperser mill, or alternatively, a sand mill, a pebble mill, a roller mill, or a ball mill. Then the non-film-forming polymer particles and film-forming binder plus conventional let down ingredients are added to the resulting mixture and blended in, suitably with a conventional tank stirrer. The resulting paint is an intimate dispersion.

The following Examples illustrate the merits of this invention and provide methods of practicing the invention but should not be construed as limiting the scope of this invention.

EXAMPLE 1

|  | Gallons | Pounds |
| --- | --- | --- |
| Water | 23 | 191.6 |
| Diethylene glycol | 4.3 | 40 |
| Cellosize QP12000 | 0.4 | 4.5 |
| Nuosept 95 | 0.16 | 1.5 |
| AMP-95 | 0.25 | 2.0 |
| TiO$_2$ slurry (35% water) | 7.82 | 125 |
| Alipal CO-436 | 0.34 | 3.0 |
| Texanol | 1.9 | 15 |
| Plastic pigment 0.4 micron polystyrene containing .5% copolymerized acrylic acid | 51.9 | 445 |
| Phosphate ester | 0.43 | 4.0 |
| Acrylic copolymer binder | 7.82 | 70 |
| Drew L 475 | 0.92 | 7.0 |
| Aurasperse W1025 | 0.01 | 0.2 |
| Aurasperse W7017 |  | 0.09 |
| Water | 0.78 | 6.5 |

The latex paint thus produced had a pigment-volume-content (PVC) of 80%. Dried paint film had the following film properties.

| 60° gloss | 15%–25% |
| --- | --- |
| 85° sheen | 80%–85% |
| opacity (Contrast Ratio) | 0.9962 |
| scrub resistance | 200 cycles |
| enamel holdout | negligible |
| low temperature touch-up | 40° F. (good) |
| flow/leveling | good |
| burnish | average |
| cracking | no cracking |
| film tenderness | good |

EXAMPLE 2

Similar to Example 1, a latex paint was compounded with substantially same raw materials except that plastic pigment was a polystyrene copolymer (0.6 micron) containing about 1% by weight copolymerized methacrylic acid. The wet latex paint had the following characteristics on a dry solids volume basis:

|  | Vol. Solids | % Solids |
| --- | --- | --- |
| TiO$_2$ | 2.43 | 7.5% |
| plastic pigment | 25.4 | 78.1% |
| acrylic binder | 4.67 | 14.4% |
| PVC | 78.1 |  |

Dried paint films cured for at least 24 hours at room temperature exhibited the following characteristics:

| 60° gloss | 15–25% |
| --- | --- |
| 85° sheen | 80–85% |
| Opacity (Contrast Ratio) | 0.9962 |
| Scrub | 200 cycles |
| Enamel Holdout | negligible |
| Low-temperature touch-up | good |
| Flow/leveling | good |
| Burnish | none |
| Cracking | none |
| Film Tenderness | good |

EXAMPLE 3

In a manner similar to Examples 1 and 2, comparative latex paints were produced except that a vinyl acetate copolymer was substituted for an all acrylic copolymer (this invention) with the following comparative results:

|  | Acrylic Binder | Vinyl Binder |
|---|---|---|
| 60° gloss | 21 | 18 |
| 85° sheen | 82 | 80 |
| Opacity (Contrast Ratio) | 0.996 | 0.992 |
| Enamel Holdout | negligible | negligible |
| Low temperature touch-up | good | fair |
| Flow/leveling | good | good |
| Cracking | good | poor |
| Film tenderness | good | brittle |
| Scrub cycles | 200 | 25 |

EXAMPLE 4

In a manner similar to Examples 1 and 2, comparative tests were run similar paint compositions except that plastic pigment produced from homopolystyrene was substituted for copolymer polystyrene containing 1% copolymerized methacrylic acid (this invention).

|  | Polystyrene copolymer | Polystyrene homopolymer |
|---|---|---|
| Wet Adhesion* | good | poor |
| Adhesion (unpainted surface) | good | good |

*Wet adhesion was tested by applying test samples over a previously painted semi-gloss enamel surface. After the test paint dried, the films were scrubbed. The homopolymer plastic pigment immediately failed whereas the copolymer plastic pigment maintained good adhesion after 200 cycles. The polystyrene homopolymer plastic pigment further exhibited low and inadequate adhesion before scrubbing. The same paint samples were applied to new unpainted surfaces and adhesion was comparable.

The foregoing examples demonstrate the advantages of this invention directed to very high PVC latex paints containing plastic pigment wherein said paints contain acrylic binders, minor amounts of opacifying pigment, and plastic pigment copolymer containing between 0.2 and 2% copolymerized carboxyl groups to produce highly loaded paints at 75% to 85% PVC. The foregoing examples are not intended to be limiting except as defined in the appended claims.

We claim:

1. An aqueous latex dispersion paint composition which coalesces at an ambient coalescent temperature into a hardened paint film, said latex paint having about 30% to 70% by weight total solids, the improvement comprising on a dry solids volumn basis:
    15% to 25% of a film-forming acrylic latex binder having an average polymer particle size between about 0.1 and 0.5 microns and a glass transition temperature at least about 5° C. below said coalescent temperature whereby said binder particles will coalesce into a binding matrix, said binder being an acrylic copolymer derived from copolymerization of at least 90% acrylic monomer and the remaining being ethylenically unsaturated monomers on a weight basis;
    72% to 77% of solid, non-cellular, non-film-forming polymer particles having an average particle size diameter of between about 0.2 and 0.8 micron and having a glass transition temperature at least about 30° C. above the glass transition temperature of said acrylic binder, said non-film-forming particles being polymerized ethylenically unsaturated monomers having carbon-to-carbon unsaturation copolymerized with 0.2 to 2% by weight unsaturated acid selected from acrylic or methacrylic acid;
    3% to 8% opacified pigment having refractive index of at least about 1.8;
    said latex paint substantially free of inorganic non-opacifying pigment; and said latex paint having a pigment-volume-content (PVC) greater than 75% and less than 85% PVC.

2. The latex paint in claim 1 wherein the binder polymer consists of copolymerized acrylic monomers.

3. An aqueous latex dispersion paint composition which coalesces at an ambient coalescent temperature into a hardened paint film, said latex paint having about 30% to 70% by weight total solids, the improvement comprising on a dry solids volume basis:
    15% to 25% of a film-forming acrylic latex binder having an average polymer particle size between about 0.1 and 0.5 microns and a glass transition temperature at least about 5° C. below said coalescent temperature whereby said binder particles will coalesce into a binding matrix, said binder being an acrylic copolymer derived from copolymerization of at least 90% acrylic monomer and the remaining being ethylenically unsaturated monomers on a weight basis;
    72% to 77% of solid, non-cellular, non-film-forming polymer particles having an average particle size diameter of between about 500° A and 5000 A° and having a glass transition temperature at least about 30° C. above the glass transition temperature of said acrylic binder, said non-film-forming particles being polymerized ethylenically unsaturated monomers having carbon-to-carbon unsaturation copolymerized with 0.2 to 2% by weight unsaturated acid selected from acrylic or methacrylic acid;
    3% to 8% opacified pigment having refractive index of at least about 1.8; and
    said latex paint substantially free of inorganic non-opacifying pigment and having a pigment-volume-content (PVC) greater than 75% PVC and less than 85% PVC.

4. The latex paint in claim 3 wherein the binder polymer consists of copolymerized acrylic monomers.

\* \* \* \* \*